United States Patent
Takahashi et al.

(10) Patent No.: US 6,323,275 B2
(45) Date of Patent: *Nov. 27, 2001

(54) CYANOACRYLATE ADHESIVE COMPOSITION

(75) Inventors: Shin Takahashi, Aichi; Asako Kaai, Toukai; Toshio Okuyama; Seitaro Tajima, both of Nagoya; Takahashi Horie, Takaoka, all of (JP)

(73) Assignee: Toagosei Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/128,798

(22) Filed: Aug. 4, 1998

Related U.S. Application Data

(63) Continuation of application No. 08/257,957, filed on Jun. 10, 1994, now abandoned, which is a continuation of application No. 08/063,989, filed on May 19, 1993, now abandoned.

(30) Foreign Application Priority Data

May 28, 1992 (JP) .................................................. 4-159995
May 29, 1992 (JP) .................................................. 4-164021
May 29, 1992 (JP) .................................................. 4-164022

(51) Int. Cl.$^7$ ...................................................... C08K 5/05
(52) U.S. Cl. ..................... 524/765; 524/773; 524/775; 524/789; 526/298
(58) Field of Search ................................ 524/765, 773, 524/775, 789; 526/298

(56) References Cited

U.S. PATENT DOCUMENTS

| | | |
|---|---|---|
| 2,784,127 | 3/1957 | Joyner et al. . |
| 3,667,472 | 6/1972 | Halpern . |
| 4,062,827 | 12/1977 | Zollmann . |
| 4,170,585 | 10/1979 | Motegi et al. ................... 260/33.2 |
| 4,171,416 | 10/1979 | Motegi et al. ................... 526/245 |
| 4,196,271 | 4/1980 | Yamada et al. .................. 525/242 |
| 4,307,216 | 12/1981 | Shiraishi et al. . |
| 4,321,180 | 3/1982 | Kimura et al. ................... 524/549 |
| 4,364,876 | 12/1982 | Kimura et al. ................... 260/465.4 |
| 4,378,457 | 3/1983 | Gruber et al. . |
| 4,393,183 | 7/1983 | Kimura et al. ................... 526/245 |
| 4,421,909 | 12/1983 | Gruber et al. . |
| 4,444,933 | 4/1984 | Columbus et al. . |
| 4,556,700 | 12/1985 | Harris et al. . |
| 4,818,325 | 4/1989 | Hiraiwa et al. .................. 156/315 |
| 4,837,260 | 6/1989 | Sato et al. ....................... 524/261 |
| 5,536,799 | 7/1996 | Takahashi et al. ............... 526/298 |

FOREIGN PATENT DOCUMENTS

| | | |
|---|---|---|
| 088927 | 3/1982 | (EP) . |
| 063037 | 7/1982 | (EP) . |
| 229367 | 7/1987 | (EP) . |
| 235935 | 9/1987 | (EP) . |
| 54028342 | 3/1979 | (JP) . |
| 60-37836B | 3/1979 | (JP) . |
| 55012166 | 1/1980 | (JP) . |
| 56-95968A | 8/1981 | (JP) . |
| 1-43790B | 1/1983 | (JP) . |
| 58-8771 | 1/1983 | (JP) . |
| 58-168677A | 10/1983 | (JP) . |
| 58-185666 | 10/1983 | (JP) . |
| 60-166361 | 8/1985 | (JP) . |
| 62-11784 | 1/1987 | (JP) . |
| 3-167279A | 7/1991 | (JP) . |

OTHER PUBLICATIONS

Hawley's Condensed Chem. Dictionary, 11th ed., Van Nostrand Reinhold, NY, p. 418.

*Primary Examiner*—Bernard Lipman
(74) *Attorney, Agent, or Firm*—Brobeck, Phleger & Harrison LLP

(57) ABSTRACT

A cyanoacrylate adhesive composition is disclosed which has a lowered adhesion to the skin and contains at least one compound selected from the groups mentioned below and an anionic polymerization accelerator:

A: An aliphatic alcohol having an aliphatic group in which 6 or more carbon atoms are directly bonded with each other;

B: An aliphatic carboxylic acid ester having an aliphatic group in which 6 or more carbon atoms are directly bonded with each other;

C: An aliphatic carboxylic acid ester having at least 2 aliphatic groups in which 4 or more carbon atoms are directly bonded with each other; and D: A carboxylic acid ester of a carbocyclic compound having, in a carboxylic acid residue or alcohol residue, an aliphatic group in which 5 or more carbon atoms are directly bonded with each other.

67 Claims, No Drawings

CYANOACRYLATE ADHESIVE COMPOSITION

CROSS REFERENCE TO RELATED APPLICATIONS

This Application is a continuation of application Ser. No. 08/257,957 entitled "Cyanoacrylate Adhesive Composition" filed Jun. 10, 1994, now abandoned, which is hereby incorporated by reference herein in its entirety, and which is a continuation of application Ser. No. 08/063,989 filed May 19, 1995, now abandoned.

The present invention relates to a cyanoacrylate adhesive composition having a weakened adhesion to the skin and can widely be used in various industries, medical fields, leisure fields, and household fields where cyanoacrylate adhesives are utilized as an instantaneous adhesive.

Cyanoacrylate adhesives containing 2-cyanoacrylate as a principal component have favorably been used in various industries, medical fields, leisure fields, and household fields as an instantaneous adhesive, since the adhesives have the property that 2-cyanoacrylate as a principal component is readily anionic-polymerized to rapidly cure in the presence of a very small amount of moisture or a basic substance.

However, 2-cyanoacrylate adhesives have such problems that the adhesives bond a part of the skin with another part of the skin of a person who handles the adhesive or that the adhesives bond the skin with other adherends than the skin if the adhesives were used incorrectly, while the adhesives have such a convenient property that they can join glass, metal, plastic, wood, fabric, and paper instantaneously.

The troubles are caused by the existence of moisture and basic substances contained in sweat and secretions on the surface of human skin. The moisture and basic substances accelerate anionic polymerization of 2-cyanoacrylate adhesives so that the skin is readily bonded.

Since the skin adheres to another part of the skin or other adherends through 2-cyanoacrylate adhesives with a high bonding strength, if the adhered skin was forced to be torn off, the skin or subcutaneous tissue may be seriously injured.

Based on the background mentioned above, the development of an instantaneous adhesive is strongly desired, which lowers such a trouble that the adhesive adheres to the skin at the time of adhesion operation and which can be handled more easily and safely than conventional instantaneous adhesives.

As a result of the study to solve the problems mentioned above, it has been found that a cyanoacrylate adhesive composition containing at least one specific aliphatic alcohol, aliphatic carboxylic acid ester, or carboxylic acid ester of a carbocyclic compound has a low bonding rate on the skin, but bonds adherends other than the skin such as woods, plastics, rubbers, metals, and ceramics instantaneously.

The present invention relates to a cyanoacrylate adhesive composition having a lowered adhesion to the skin, which comprises at least one compound selected from the groups mentioned below and an anionic polymerization accelerator:

A: An aliphatic alcohol in which the aliphatic group contains 6 or more carbon atoms directly bonded with each other;

B: An aliphatic carboxylic acid ester in which the aliphatic group contains 6 or more carbon atoms directly bonded with each other;

C: An aliphatic carboxylic acid ester having at least 2 aliphatic groups in which the aliphatic group contains 4 or more carbon atoms directly bonded with each other; and D: A carboxylic acid ester of a carbocyclic compound having an aliphatic group as a carboxylic acid residue or an alcohol residue, in which said aliphatic group contains 5 or more carbon atoms directly bonded with each other.

The adhesive composition of the present invention will be described in detail below.

A principal component of cyanoacrylate adhesives is a 2-cyanoacrylate. Various kinds of 2-cyanoacrylates can be used as a principal component even in the adhesive composition of the present invention as in conventional cyanoacrylate adhesives, and specific examples of the 2-cyanoacrylates include methyl, ethyl, chloroethyl, n-propyl, i-propyl, allyl, propargyl, n-butyl, i-butyl, n-pentyl, n-hexyl, cyclohexyl, phenyl, tetrahydrofurfuryl, heptyl, 2-ethylhexyl, n-octyl, n-nonyl, oxononyl, n-decyl, n-dodecyl, 2-ethoxyethyl, 3-methoxybutyl, 2-ethoxy-2-ethoxyethyl, butoxy-ethoxy-ethyl, 2,2,2-trifluoroethyl, or hexafluoroisopropyl ester of 2-cyanoacrylic acid.

Specific examples of the aliphatic alcohol, under the Group A mentioned above, having an aliphatic group in which 6 or more carbon atoms are directly bonded with each other include monohydric alcohols, such as n-hexyl alcohol, n-octyl alcohol, n-nonyl alcohol, 2-nonyl alcohol, decyl alcohol (decanol), lauryl alcohol (dodecyl alcohol/dodecanol), tridecyl alcohol (tridecanol), tetradecyl alcohol, pentadecyl alcohol, β-citronellol, 9-decene-1-ol, 1,1-dimethyl-5-methyl-6-heptene-1-ol, dihydromyrcenol, geraniol, 1,5-dimethyl-1-vinyl-4-hexene-1-ol, and ω-undecenyl alcohol. While alcohols mentioned above are preferable in the present invention, the aliphathic alcohol is not restricted to such alcohols.

The alcohol used in the present invention is an aliphatic alcohol having an aliphatic group in which 6 or more carbon atoms are directly bonded with each other. If all of the aliphatic groups in the molecule have 5 or less carbon atoms directly bonded with each other, the bonding rate on the skin becomes fast and troubles are caused at the time of adhesion operation so that such alcohols can not be used to achieve the purpose of the present invention.

Conversely, when the alcohol has, in its molecule, an aliphatic group in which 16 or more carbon atoms are bonded, the solubility of the alcohol in a cyanoacrylate becomes worse. Accordingly, aliphatic alcohols used for the present invention preferably have an aliphatic group in which 15 or less carbon atoms are directly bonded with each other, and more desirably the alcohols have an aliphatic group in which 8 to 15 carbon atoms, particularly, 9 to 15 carbon atoms are directly bonded with each other.

As will be clear from the specific examples mentioned above, the aliphatic group is preferably a hydrocarbon group (linear or branched polymethylene or polyolefin).

When the amount of the aliphatic alcohol to be added to the adhesive composition of the present invention is small, a sufficient inadhesiveness to the skin can not be obtained. When the amount is too much, however, the bonding rate on adherends other than the skin becomes slow, and thus, it is desirable to adjust the concentration of the alcohol in the cyanoacrylate adhesive composition to 10 to 40% by weight, and more desirably to 15 to 30% by weight.

Specific examples of the aliphatic carboxylic acid ester, under the Group B mentioned above, having an aliphatic group in which 6 or more carbon atoms are directly bonded with each other, and examples of the aliphatic carboxylic acid ester, under the Group C mentioned above, having at least 2 aliphatic groups in which 4 or more carbon atoms are directly bonded with each other include the following compounds:

Monocarboxylic Acid Ester

Cetyl 2-ethyl hexylate, methyl ester of coconut fatty acid, methyl laurate, isopropyl myristate, methyl caprate, methyl oleate, isobutyl oleate, octyl oleate, 2-ethylhexyl crotonate, octyl acrylate, decyl methacrylate, tridecyl methacrylate, lauryl methacrylate, and lauryl propiolate.

Polycarboxylic Acid Ester

Bis(2-ethylhexyl)adipate, bis(2-ethylhexyl)maleate, dimethyl sebacate, bis(2-ethylhexyl)sebacate, bis(2-ethylhexyl) decamethylenedicarboxylate, 2,2,4-trimethyl-1,3-pentanediolmonoisobutylate, 2,2,4-trimethyl-1,3-pentanedioldiisobutylate, triglyceride 2-ethyl hexanoate, triglyceride caprylate, diglyceride caprylate, and triglyceride caprate.

Carboxylic Acid Ester Having at Least 2 Aliphatic Groups

Diisobutyl fumarate, diisobutyl maleate, tributyl acetyl citrate, and triglyceride caproate.

As explained above, the aliphatic carboxylic acid ester used in the present invention has an aliphatic group in which 6 or more carbon atoms are directly bonded with each other, or has at least 2 aliphatic groups in which 4 or more carbon atoms are directly bonded with each other. When all of the aliphatic groups in the molecule has 5 or less carbon atoms directly bonded with each other, or the aliphatic carboxylic acid ester does not have at least 2 aliphatic groups in which 4 or more carbon atoms are directly bonded each other, the bonding rate on the skin becomes high and troubles are apt to be caused at the time of adhesion.

However, when the aliphatic group present in the molecule has 16 or more carbon atoms directly bonded with each other, the solubility of the aliphatic carboxylic acid ester in a cyanoacrylate becomes poor. Thus, the number of the carbon atoms directly bonded in the aliphatic group is preferably 15 or less, and more preferably 8 to 13. The aliphatic carboxylic acid ester is preferably 150 to 2000 in terms of molecular weight.

Further, as to the aliphatic carboxylic acid ester having at least 2 aliphatic groups in which 4 or more carbon atoms are directly bonded with each other, the ester having at least 3 aliphatic groups are preferably used in the present invention.

The aliphatic carboxylic acid ester mentioned above is added in the cyanoacrylate adhesive composition preferably in an amount of 1 to 40% by weight, and more preferably 5 to 30% by weight, since when the amount is small, a sufficient inadhesiveness can not be obtained, while when the amount of the ester to be added is too large, the bonding rate on adherends other than the skin becomes slow.

The carbocyclic carboxylic acid ester, under the Group D, having, in a carboxylic acid residue or alcohol residue, an aliphatic group in which 5 or more carbon atoms are directly bonded with each other is an ester of a carbocyclic carboxylic acid with an alcohol. Specific examples of the acid and the alcohol include the following compounds:

Carbocyclic Carboxylic Acid

Benzoic acid, o-toluic acid, m-toluic acid, p-toluic acid, o-chlorobenzoic acid, salicylic acid, anisic acid, vanillic acid, veratric acid, peperonylic acid, protocatechuic acid, gallic acid, syringic acid, cyclohexane carboxylic acid, 3-biphenyl carboxylic acid, 1,5-naphthalene dicarboxylic acid, 2-naphthalene hexanoic acid. 1,3,6-naphthalene triacetic acid, camphoric acid, phthalic acid, isophthalic acid, terephthalic acid, hemimellitic acid, trimellitic acid, trimesic acid, prehnitic acid, mellophanic acid, pyromellitic acid, benzene pentacarboxylic acid, mellitic acid, phenyl acetic acid, hydrocinnamic acid, γ-phenyl butyric acid, δ-phenyl-n-valerianic acid, ϵ-phenyl-n-capric acid, cinnamic acid, phenyl propiolic acid, homophthalic acid, o-phenylene diacetic acid, m-phenylene diacetic acid, p-phenylene diacetic acid, o-phenylene acetic acid-β-propionic acid, cinamal malonic acid, ω-phenyl-n-propyl malonic acid, acetyl cumaric acid, and cochenilic acid.

Alcohol n-pentyl alcohol, n-hexyl alcohol, n-octyl alcohol, 2-ethylhexyl alcohol, n-nonyl alcohol, isononyl alcohol, decyl alcohol, isodecyl alcohol, tridecyl alcohol, tetradecyl alcohol, pentadecyl alcohol, β-citronellol, 9-decene-1-ol, 1,1-dimethyl-5-methyl-6-heptene-1-ol, geraniol, 1,5-dimethyl-1-vinyl-4-hexene-1-ol, and ω-undecenyl alcohol.

In the carbocyclic carboxylic acid ester, under the Group D, used in the present invention, the aliphatic group in which 5 or more carbon atoms are directly bonded with each other may present in a carboxylic acid residue, for instance, between a carbon ring and a carboxyl group as a substituent on the carbon ring, or may exists in an alcohol residue. In the present invention, the ester prepared by using an alcohol having an aliphatic group in which 5 or more carbon atoms are directly bonded with each other is preferable, and specific examples of such ester include the following compounds.

Carbocyclic Carboxylic Acid Ester

Dihexyl phthalate, diheptyl phthalate, dioctyl phthalate, bis(2-ethylhexyl)phthalate, diisononyl phthalate, diisodecyl phthalate, diisotridecyl phthalate, dipentadecyl phthalate, dioctyl terephthalate, diisononyl isophthalate, decyl toluylate, bis(2-ethylhexyl)camphorate, 2-ethylhexyl cyclohexyl carboxylate, 2-ethylhexylbenzoate, bis(2-ethylhexyl)pyromellitate, and tris(2-ethylhexyl)trimellitate.

If the carbocyclic carboxylic acid ester having only aliphatic group in which less than 5 carbon atoms are directly bonded with each other is used, the bonding rate of the adhesive to the skin becomes high and the purpose of the present invention can not be attained.

In order to bring the effect of the present invention into fully play, it is preferable to use a carbocyclic carboxylic acid ester having an aliphatic group in which 6 or more, more desirably 8 or more, particularly 9 or more carbon atoms are directly bonded with each other.

However, when the carbocyclic carboxylic acid ester having an aliphatic group in which too many carbon atoms are directly bonded with each other was used as the ester in the present invention, the solubility of the ester in a cyanoacrylate becomes poor, and there is a fear that troubles are produced in the preparation of the adhesive.

Thus, the carbocyclic carboxylic acid ester to be used in the present invention preferably has only aliphatic group in which less than 15 carbon atoms are directly bonded with each other, and more preferably less than 13 carbon atoms.

Specific examples of preferable carbocyclic carboxylic acid ester in the present invention include bis(2-ethylhexyl) phthalate, diisononyl phthalate, diisodecyl phthalate, diisotridecyl phthalate, and tris(2-ethylhexyl)trimellitate.

The amount of the carbocyclic carboxylic acid ester to be added in the present invention is preferably 1 to 40% by weight, and more preferably 5 to 30% by weight in the cyanoacrylate adhesive composition. When the amount is small, a sufficient inadhesiveness can not be obtained, while the amount is too much, the bonding rate on adherends other than the skin becomes slow.

It was known that when an anionic polymerization accelerator was blended in a cyanoacrylate adhesive, the bonding rate of the cyanoacrylate adhesive on the skin or on other substances became fast. However, as a result of the study by the present inventors, it has been found that when at least one specific aliphatic alcohol, aliphatic carboxylic acid ester, or carbocyclic carboxylic acid ester as well as an anionic polymerization accelerator were added together to a cyanoacrylate adhesive, the effect of increasing the bonding rate on the skin is low, while the effect of increasing the bonding rate on adherends other than the skin, such as woods, plastics, rubbers, and ceramics is excellent, leading to the preparation of an excellent adhesive of the present invention.

As the anionic polymerization accelerator to be used in the present composition, the following compounds are mentioned.

First, a polyalkylene oxide or its derivatives can be mentioned, and the known compounds such as disclosed in JP 60-37836B, JP 60-26513B, and JP 1-43790B, JP 63-128088A and JP 3-167279A can all be used. Specific examples of the polymerization accelerator include the followings:

Polyalkylene Oxide

Diethylene glycol, triethylene glycol, tetraethylene glycol, polyethylene glycol, polypropylene-glycol, poly(1,3-propylene glycol), polytrimethylene oxide, polytetramethylene oxide, polyepichlorohydrin, poly(3,3-bis(chloromethyl)butylene oxide), polytetramethylene ether glycol, poly(1,3-dioxolane), poly(2,2-bis(chloromethyl) propylene oxide), ethylene oxide-propylene oxide block polymer, polyglycerins such as diglycerin, triglycerin, and tetraglycerin, formaldehyde condensation products, acetaldehyde condensation products, and trioxane polymers. Further, various kinds of polyalkylene oxides which are sold on the market as polyols for curing polyether urethanes can be used in the present invention.

Derivatives of a Polyalkylene Oxide

Derivatives of a polyalkylene oxide are represented by an ester of a polyalkylene oxide mentioned above with an acid or represented by an ether of the polyalkylene oxide with a hydroxy group-containing compound. While those derivatives are preferable, the derivatives are not restricted to them. Thus, the derivatives having a polyalkylene oxide structure in their molecule, such as ones having various kinds of substituents at their end and ones having another bonding portion in their molecule can better attain the purpose of the present invention.

As an acid which may constitute the ester, there may be mentioned acetic acid, propionic acid, butyric acid, isobutyric acid, pivalic acid, pentanoic acid, n-hexanoic acid, 2-methylpentanoic acid, n-octanoic acid, n-decanoic acid, lauric acid, palmitic acid, stearic acid, oleic acid, cyclohexyl carboxylic acid, cyclopentyl carboxylic acid, cyclopropyl carboxylic acid, acrylic acid, methacrylic acid, maleic acid, itaconic acid, naphthenic acid, benzoic acid, β-napthyl carboxylic acid, p-toluene carboxylic acid, furan carboxylic acid, p-chlorobenzoic acid, monochloroacetic acid, cyanoacetic acid, glycolic acid, lactic acid, phenyloxy propionic acid, succinic acid, glutaric acid, adipic acid, sebacic acid, butane tetracarboxylic acid, aconitic acid, propane-1,2,3-tricarboxylic acid, citric acid, orthophthalic acid, isophthalic acid, trimellitic acid, and pyromellitic acid.

As a hydroxy group-containing compound which may constitute the ether, there may be mentioned methanol, ethanol, propanol, isobutanol, hexanol, cyclohexanol, 2-ethylhexanol, decanol, lauryl alcohol, cetyl alcohol, stearyl alcohol, oleyl alcohol, phenol, α-naphthol, β-naphthol, cresol, t-butyl phenol, octyl phenol, nonyl phenol, p-chlorophenol, resol, bisphenol A, 2-chloroethanol, ethylene cyanhydrin, trifluoroethanol, benzyl alcohol, 1,4-butane diol, 1,6-hexane diol, glycerin, sorbitol, hydrogenated bisphenol A, and trimethylol propane.

Specific examples of the ether as a polyalkylene oxide derivative include diethyleneglycol monoalkyl ether (as the alkyl, for instance, methyl, ethyl, propyl, or butyl may be used), diethyleneglycol dialkyl ether (as the alkyl, for instance, methyl, ethyl, propyl, or butyl may be used), polyethyleneglycol monoalkyl ether (as the alkyl, for instance, methyl, ethyl, propyl butyl, lauryl, cetyl, stearyl, or oleyl may be used), polypropyleneglycol monoalkyl ether (as the alkyl, for instance, methyl, ethyl, propyl, butyl, lauryl, cetyl, stearyl, oleil, or perfluoroalkyl may be used), polyethyleneglycol monoaryl ether (as the aryl, for instance, octylphenyl or nonylphenyl may be used), polyethyleneglycol dialkyl ether, polypropyleneglycol dialkyl ether, and polyethyleneglycol diaryl ether.

Specific examples of the ester as a polyalkylene oxide derivative include polyethyleneglycol monoalkyl ester (for example, acetate, trifluoroacetate, laurate, stearate, oleate, and methacrylate), polyethyleneglycol diester, polypropyleneglycol diester, bisphenol A-polyalkylene oxide addition product (as the alkylene, for instance, ethylene or propylene may be used), hydrogenated bisphenol A-polyalkylene oxide addition product (as the alkylene, for instance, ethylene or propylene may be used), trimethylol propane-polyalkylene oxide addition product (as the alkylene, for instance, ethylene or propylene may be used), glycerin-polyalkylene oxide addition product (as the alkylene, for instance, ethylene or propylene may be used), polyoxyethylene sorbitan ester, tetraoleic acid-polyoxyethylene sorbit addition product, adipic acid-polyalkylene oxide addition product (as the alkylene, for instance, ethylene or propylene may be used), trimellitic acid-polyalkylene oxide addition product (as the alkylene, for instance, ethylene or propylene may be used), isocyanate compound-polyalkylene oxide addition product (as the alkylene, for instance, ethylene or propylene may be used), phosphoric acid-polyalkylene oxide addition product (as the alkylene, for instance, ethylene or propylene may be used), silicic acid-polyalkylene oxide addition product (as the alkylene, for instance, ethylene or propylene may be used), (polyoxyalkylene)polysilalate, (polyoxyalkylene) polyester, and (polyoxyalkylene)polyphosphate.

As a second anionic polymerization accelerator, a crown ether or its derivatives can be mentioned, and the known compounds such as disclosed in U.S. Pat. No. 4,171,416, JP 3-167279A, and others can all be used. Specific examples of the crown ether or its derivatives include the followings:

Crown Ether and Its Derivatives 15-crown-5, 18-crown-6, dibenzo-18-crown-6, benzo-15-crown-5, dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crwon-8, cyclohexyl-12-crown-4, 1,2-decalyl-15-crown-5, 1,2-naphtho-15-crown-5, 3,4,5-naphthyl-16-crown-5, 1,2-methylbenzo-18-crown-6, 1,2-methylbenzo-5,6-methylbenzo-18-crown-6, 1,2-tert-butyl-18-crown-6, 1,2-vinylbenzo-15-crown-5, 1,2-vinylbenzo-18-crown-6, 1,2-tert-butylcyclohexyl-18-crown-6, and 1,2-benzo-1,4-benzo-5-oxygen-20-crown-7.

As a third anionic polymerization accelerator, a silacrown or its derivatives can be mentioned, and the compounds disclosed in Japanese Examined Patent Publication (Kokoku) No. 62-31034 and Japanese Unexamined Patent Publication (Kokai) No. 60-168775 can all be used. Specific examples of such compounds include the followings:

Silacrown Compounds

Dimethylsila-11-crown-4, dimethylsila-14-crown-5, and dimethylsila-17-crown-6.

As a fourth anionic polymerization accelerator, calixarene derivatives can be mentioned, and the known compounds such as disclosed in JP 60-179482A, JP 62-235379, and JP 63-88152A can all be used.

Specific examples of the compounds include ones represented by formulas (1) and (2).

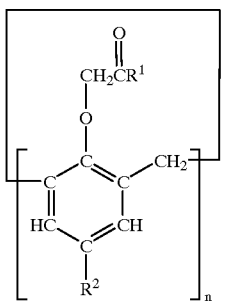

(1)

wherein $R^1$ represents alkyl, alkoxy, substituted alkyl, or substituted alkoxy group, $R^2$ represents hydrogen atom or alkyl group, and n represents 4, 6, or 8.

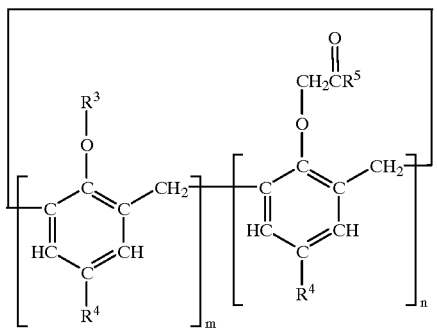

(2)

wherein both m and n are integers and satisfy an equation, m+n=4, 6 or 8, and equation, $n \geq 1/2$ (m+n). $R^3$ represents hydrogen atom, or hydrocarbyl or substituted hydrocarbyl group. $R^4$ represents hydrogen atom, or hydrocarbyl, aryl, hydrocarbyl aryl, substituted hydrocarbyl, substituted aryl, or substituted hydrocarbyl aryl group. $R^5$ represents aryl, hydrocarbyl aryl, allyloxy, hydrocarbyl allyloxy, substituted aryl, substituted hydrocarbyl aryl, substituted allyloxy, or substituted hydrocarbyl allyloxy group. When $R^4$ is aryl, hydrocarbyl aryl, substituted aryl, or substituted hydrocarbyl aryl group, $R^5$ is hydrocarbyl, hydrocarbyloxy, substituted hydrocarbyl, or substituted hydrocarbyloxy group.

As a fifth anionic polymerization accelerator, a cyclosulfur compound can be mentioned, and the known compounds disclosed, for example, in JP 59-64681A can all be used. They are cyclosulfur compounds having polysulfide linkage and ether linkage in the molecule, and represented by formula (3).

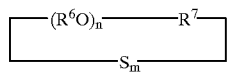

(3)

wherein $R^6$ and $R^7$ represent hydrocarbon chain having 2 to 6 carbon atoms, m represents an integer of 2 to 4, and n represents an integer of 1 to 3.

The amount of the anionic polymerization accelerator to be added is preferably 10 to 100,000 ppm, more desirably 30 to 10,000 ppm based on a cyanoacrylate adhesive composition.

When the amount of the anionic polymerization accelerator to be added is smaller than 10 ppm, rapid cureability of the adhesive can hardly be obtained, while when the amount exceeds 100,000 ppm, the bonding strength and storage stability of the adhesive considerably decrease and much improvement in cureability is no longer expected.

As in conventional cyanoacrylate adhesives, it is preferable to include a very small quantity of, for example, hydroquinone or sulfurous acid gas as a polymerization inhibitor in the cyanoacrylate adhesive composition of the present invention to improve the storage stability.

While 2-cyanoacrylate is inherently a colourless, transparent liquid substance having a low viscosity, a better effect can be obtained when it is made into a viscous or thixotropic liquid by dissolving or dispersing a thickener such as polymethyl methacrylate, acrylic rubber, cellulose derivative, and fumed silica in the present adhesive composition.

Further, the cyanoacrylate adhesive composition of the present invention can be coloured by a specific dye.

While any mechanism has not yet been elucidated, the cyanoacrylate adhesive composition of the present invention exhibits a very remarkable behavior that it shows an excellent instantaneous adhesive property for adherends other than the skin, such as woods, plastics, rubbers, metals, and ceramics, but does not show the instantaneous adhesion property for the skin.

The cyanoacrylate adhesive composition of the present invention will decrease the trouble of "skin adhesion" upon adhesion operation. Thus, the cyanoacrylate adhesive composition of the present invention has advantages that it can widely be used in more applications than conventional cyanoacrylate adhesives and that it can be used more safely in a house or school for bonding stationery as well as in various industries, medical fields and leisure fields.

EXAMPLES

Now the present invention will be described in further detail with reference to Examples. However, it should be understood that the present invention is by no means restricted to such specific Examples.

Examples 1 Through 38

Adhesion tests were conducted by using various kinds of adherends shown in Table 1 and fingers of individuals shown in Table 2 with the adhesives shown in Tables 3, 4, 5, and 6.

TABLE 1

| Adherend | Producer | Size |
| --- | --- | --- |
| Rigid polyvinyl chloride | Japan Test Panel Kogyo Kabushiki Kaisha | In accordance with JIS K 6849 |
| Balsa | Japan Test Panel Kogyo Kabushiki Kaisha | In accordance with JIS K 6850 |
| Chloroprene rubber | Japan Test Panel Kogyo Kabushiki Kaisha | In accordance with JIS K 6850 |

TABLE 2

| Individual who conducted test | Distinction of sex | Age |
|---|---|---|
| A | Male | 23 |
| B | Male | 35 |
| C | Male | 52 |
| D | Female | 23 |

TABLE 3

| Example | 2-cyanoacrylic acid ester (wt %) | | Alcohol (wt %) | | Additive (wt %) | | Stabilizer (ppm) | | Polymerization accelerator (ppm) | |
|---|---|---|---|---|---|---|---|---|---|---|
| 1 | Ethyl ester | 70 | n-hexanol | 30 | | | SO$_2$ | 20 | 18-crown-6 | 200 |
| | | | | | | | HQ | 500 | | |
| 2 | Ethyl ester | 70 | n-octanol | 30 | | | SO$_2$ | 20 | 18-crown-6 | 200 |
| | | | | | | | HQ | 500 | | |
| 3 | Ethyl ester | 70 | Decanol | 30 | | | SO$_2$ | 20 | 18-crown-6 | 200 |
| | | | | | | | HQ | 500 | | |
| 4 | Ethyl ester | 75 | Tridecanol | 25 | | | SO$_2$ | 20 | 18-crown-6 | 200 |
| | | | | | | | HQ | 500 | | |
| 5 | Ethyl ester | 70 | Tridecanol | 30 | | | SO$_2$ | 20 | 18-crown-6 | 200 |
| | | | | | | | HQ | 500 | | |
| 6 | Ethyl ester | 70 | Oxocol 1213 | 20 | Acrylic polymer | 3.7 | SO$_2$ | 20 | 18-crown-6 | 200 |
| | | | | | AEROSIL R974 | 6.3 | HQ | 500 | | |
| 7 | Ethyl ester | 77 | Oxocol 1213 | 23 | | | SO$_2$ | 20 | 18-crown-6 | 200 |
| | | | | | | | HQ | 500 | | |

TABLE 4

| Example | 2-cyanoacrylic acid ester (wt %) | | Alcohol (wt %) | | Additive (wt %) | Stabilizer (ppm) | | Polymerization accelerator (ppm) | |
|---|---|---|---|---|---|---|---|---|---|
| 8 | Ethyl ester | 80 | Oxocol 1215 | 20 | | SO$_2$ | 20 | 18-crown-6 | 200 |
| | | | | | | HQ | 500 | | |
| 9 | Ethyl ester | 77 | Oxocol 1215 | 23 | | SO$_2$ | 20 | 18-crown-6 | 200 |
| | | | | | | HQ | 500 | | |
| 10 | Ethyl ester | 70 | n-hexanol | 30 | | SO$_2$ | 20 | Dimethyl- | 5000 |
| | | | | | | HQ | 500 | sila-17-crown-6 | |
| 11 | Ethyl ester | 70 | n-octanol | 30 | | SO$_2$ | 20 | Calixarene | 5000 |
| | | | | | | HQ | 500 | #1 | |
| 12 | Ethyl ester | 70 | Decanol | 30 | | SO$_2$ | 20 | Calixarene | 5000 |
| | | | | | | HQ | 500 | #2 | |
| 13 | Ethyl ester | 75 | Tridecanol | 25 | | SO$_2$ | 20 | Cyclosulfur | 1000 |
| | | | | | | HQ | 500 | compound | |

TABLE 5

| Example | Aliphatic carboxylic acid ester (wt %) | | Alcohol (wt %) | | Additive (wt %) | | Stabilizer (ppm) | | Polymerization accelerator (ppm) | |
|---|---|---|---|---|---|---|---|---|---|---|
| 14 | Ethyl ester | 80 | Methyl laurate | 20 | | | SO$_2$ | 20 | 18-crown-6 | 200 |
| | | | | | | | HQ | 500 | PEG 2000 | 2000 |
| 15 | Ethyl ester | 74 | Bis(2-ethylhexyl) | 23 | Acrylic polymer | 3 | SO$_2$ | 20 | 18-crown-6 | 500 |
| | | | | | | | HQ | 500 | | |

TABLE 5-continued

| Example | Aliphatic carboxylic acid ester (wt %) | | Alcohol (wt %) | | Additive (wt %) | | Stabilizer (ppm) | | Polymerization accelerator (ppm) | |
|---|---|---|---|---|---|---|---|---|---|---|
| 16 | Ethyl ester | 80 | Coconard MT | 10 | Acrylic polymer AEROSIL R974 | 3.7 6.3 | SO$_2$ HQ | 20 500 | 18-crown-6 | 200 |
| 17 | Ethyl ester | 74 | Diisobutyl fumarate | 23 | Acrylic polymer | 3 | SO$_2$ HQ | 20 500 | 18-crown-6 PEG 2000 | 200 2000 |
| 18 | Ethyl ester | 80 | Methyl laurate | 20 | | | SO$_2$ HQ | 20 500 | Dimethyl-sila-17-crown-6 | 5000 |
| 19 | Ethyl ester | 74 | Bis(2-ethylhexyl) adipate | 23 | Acrylic polymer | 3 | SO$_2$ HQ | 20 500 | Calixarene #1 | 1000 |
| 20 | Ethyl ester | 80 | Coconard MT | 10 | Acrylic polymer AEROSIL R974 | 3.7 6.3 | SO$_2$ HQ | 20 500 | Calixarene #2 | 5000 |
| 21 | Ethyl ester | 74 | Diisobutyl fumarate | 23 | Acrylic polymer | 3 | SO$_2$ HQ | 20 500 | Cyclosulfur compound | 1000 |
| 22 | Ethyl ester | 70 | Tributyl acetylcitrate | 30 | | | SO$_2$ HQ | 20 500 | 18-crown-6 | 200 |
| 23 | Ethyl ester | 70 | Dibutyl adipate | 30 | | | SO$_2$ HQ | 20 500 | 18-crown-6 | 200 |
| 24 | Ethyl ester | 85 | Coconard MT | 15 | | | SO$_2$ HQ | 20 500 | 18-crown-6 | 200 |
| 25 | Ethyl ester | 79 | Coconard MT | 15 | Acrylic polymer | 6 | SO$_2$ HQ | 20 500 | 18-crown-6 | 200 |
| 26 | Ethyl ester | 75 | Coconard MT | 15 | Acrylic polymer AEROSIL R974 | 3.7 6.3 | SO$_2$ HQ | 20 500 | 18-crown-6 | 200 |

TABLE 6

| Example | Carbocyclic carboxylic acid ester (wt %) | | Alcohol (wt %) | | Additive (wt %) | | Stabilizer (ppm) | | Polymerization accelerator (ppm) | |
|---|---|---|---|---|---|---|---|---|---|---|
| 27 | Ethyl ester | 70 | Bis(2-ethylhexyl) phthalate | 30 | | | SO$_2$ HQ | 20 500 | 18-crown-6 PEG 2000 | 200 2000 |
| 28 | Ethyl ester | 80 | Diisononyl phthalate | 10 | Acrylic polymer AEROSIL R974 | 3.7 6.3 | SO$_2$ HQ | 20 500 | 18-crown-6 PEG 4000 | 200 500 |
| 29 | Ethyl ester | 70 | Tris(2-ethylhexyl) trimellitate | 20 | Acrylic polymer AEROSIL R974 | 3.7 6.3 | SO$_2$ HQ | 20 500 | 18-crown-6 | 500 |
| 30 | Ethyl ester | 79 | Tris(2-ethylhexyl) trimellitate | 16.7 | Acrylic polymer | 4.3 | SQ HQ | 20 500 | 18-crown-6 | 500 |
| 31 | Ethyl ester | 70 | Bis(2-ethylhexyl) phthalate | 30 | | | SO$_2$ HQ | 20 500 | Dimethylsila-17-crown-6 | 5000 |
| 32 | Ethyl ester | 80 | Diisononyl phthalate | 10 | Acrylic polymer AEROSIL R974 | 3.7 6.3 | SO$_2$ HQ | 20 500 | Calixarene #1 | 1000 |
| 33 | Ethyl ester | 70 | Tris(2-ethylhexyl) trimellitate | 20 | Acrylic polymer AEROSIL R974 | 3.7 6.3 | SO$_2$ HQ | 20 500 | Calixarene #2 | 5000 |
| 34 | Ethyl ester | 79 | Tris(2-ethylhexyl) trimellitate | 16.7 | Acrylic polymer | 4.3 | SO$_2$ HQ | 20 500 | Cyclosulfur compound | 1000 |
| 35 | Ethyl ester | 80 | Diisononyl phthalate | 10 | Acrylic polymer AEROSIL R976 | 3.7 6.3 | SO$_2$ HQ | 20 500 | 18-crown-6 | 200 |
| 36 | Ethyl ester | 75 | Diisononyl phthalate | 15 | Acrylic polymer AEROSIL R976 | 3.7 6.3 | SO$_2$ HQ | 20 500 | 18-crown-6 | 200 |
| 37 | Ethyl ester | 80 | Bis(2-ethylhexyl) phthalate | 10 | Acrylic polymer AEROSIL R976 | 3.7 6.3 | SO$_2$ HQ | 20 500 | 18-crown-6 | 200 |
| 38 | Ethyl ester | 75 | Bis(2-ethylhexyl) phthalate | 15 | Acrylic polymer AEROSIL R976 | 3.7 6.3 | SO$_2$ HQ | 20 500 | 18-crown-6 | 200 |

Decanol, tridecanol, Oxocol 1213, and Oxocol 1215 in Tables 3 to 6 were produced by Kyowa Hakko Kogyo Co., Ltd., and Coconard MT is a triglyceride having 8 to 10 carbon atoms, produced by Kao Corporation.

Calixarene #1 as a polymerization accelerator is 37,38,39,40,41,42-hexa-(2-oxo-2-ethoxy)-ethyoxy calix[6]arene, calixarene #2 is a compound represented by formula (4), and a cyclosulfur compound is one represented by formula (5).

$$\left[ CH_2COCH_2 - \begin{array}{c} \text{aromatic ring} \end{array} \right]_4 \quad (4)$$

$$\left[ (CH_2CH_2O)_3 - CH_2CH_2 \atop S_3 \right] \quad (5)$$

Evaluation tests were conducted by the methods as follows:

(1) Method For Determining Set Time (Rigid Polyvinyl Chloride)

Test specimens of rigid polyvinyl chloride were pasted together with an adhesive in accordance with the method of JIS K 6849 and the time when the bonding strength reaches a value of higher than 3 kg was assumed to be the set time.

(Balsa, Chloroprene Rubber)

Test specimens were pasted together with an adhesive in accordance with the method of JIS K 6850 and the time when the bonding strength reaches such a degree that the test specimens can not be detached by lightly pulling them by hands toward the direction of a major axis of the test specimens was assumed to be the set time.

(Finger)

An adhesive was applied on the surface of a forefinger, the adhesive was spreaded to form a thin film by pressing lightly with a thumb, and the time (t) when the forefinger is separated from the thumb by their own ability without pain, was determined at 5 ranks of $t \leq 1$ sec, 1 sec $< t \leq 15$ sec, 15 sec $< t \leq 30$ sec, 30 sec $< t \leq 60$ sec, and 60 sec $< t$.

Environment for the determination was adjusted to a temperature of 23° C. and humidity of 60% RH.

The results of the tests are shown in Tables 7, 8, and 9.

TABLE 7

|  | Finger set time (sec) | | | | Set time (sec) | | |
| --- | --- | --- | --- | --- | --- | --- | --- |
| Example | A | B | C | D | Rigid polyvinyl chloride | Balsa | Chloroprene rubber |
| 1 | 15–30 | 30–60 | 30–60 | 30–60 | 10 | 15 | 45 |
| 2 | 30–60 | 60< | 60< | 60< | 3 | 10 | 30 |
| 3 | 60< | 60< | 60< | 60< | 10 | 20 | 60 |
| 4 | 60< | 60< | 60< | 60< | 3 | 15 | 15 |
| 5 | 60< | 60< | 60< | 60< | 3 | 30 | 20 |
| 6 | 15–30 | 60< | 30–60 | 60< | 3 | 10 | 15 |
| 7 | 60< | 60< | 60< | 60< | 10 | 20 | 30 |
| 8 | 30–60 | 60< | 60< | 60< | 10 | 20 | 20 |
| 9 | 60< | 60< | 60< | 60< | 15 | 30 | 30 |
| 10 | 15–30 | 30–60 | 30–60 | 30–60 | 10 | 25 | 45 |
| 11 | 30–60 | 60< | 60< | 60< | 3 | 15 | 30 |
| 12 | 60< | 60< | 60< | 60< | 10 | 20 | 60 |
| 13 | 60< | 60< | 60< | 60< | 3 | 25 | 30 |

TABLE 8

| Example | Finger set time (sec) A | B | C | D | Set time (sec) Rigid polyvinyl chloride | Balsa |
|---|---|---|---|---|---|---|
| 14 | 60< | 60< | 60< | 60< | 3 | 7 |
| 15 | 60< | 60< | 60< | 30–60 | 5 | 10 |
| 16 | 60< | 60< | 60< | 30–60 | 5 | 7 |
| 17 | 60< | 60< | 60< | 30–60 | 5 | 7 |
| 18 | 30–60 | 60< | 60< | 30–60 | 5 | 7 |
| 19 | 60< | 60< | 60< | 30–60 | 10 | 10 |
| 20 | 60< | 60< | 60< | 30–60 | 5 | 10 |
| 21 | 60< | 60< | 60< | 30–60 | 5 | 7 |
| 22 | 60< | 60< | 60< | 60< | 5 | — |
| 23 | 60< | 60< | 60< | 60< | 5 | — |
| 24 | 15–30 | 15–30 | 15–30 | 15–30 | 5 | — |
| 25 | 60< | 60< | 60< | 60< | 5 | — |
| 26 | 60< | 60< | 60< | 60< | 5 | — |

TABLE 9

| Example | Finger set time (sec) A | B | C | D | Set time (sec) Rigid polyvinyl chloride | Balsa |
|---|---|---|---|---|---|---|
| 27 | 60< | 60< | 60< | 60< | 3 | 3 |
| 28 | 60< | 60< | 60< | 60< | 3 | 3 |
| 29 | 60< | 60< | 60< | 60< | 5 | 10 |
| 30 | 60< | 60< | 60< | 60< | 3 | 3 |
| 31 | 60< | 60< | 60< | 60< | 5 | 7 |
| 32 | 60< | 60< | 60< | 60< | 7 | 10 |
| 33 | 60< | 60< | 60< | 60< | 7 | 10 |
| 34 | 60< | 60< | 60< | 60< | 5 | 7 |
| 35 | 60< | 60< | 60< | 60< | 3 | — |
| 36 | 60< | 60< | 60< | 60< | 3 | — |
| 37 | 30–60 | 30–60 | 30–60 | 30–60 | 3 | — |
| 38 | 60< | 60< | 60< | 60< | 3 | — |

Comparative Examples 1 Through 17

Examples were repeated except that the adhesives shown in Table 10, 11, and 12 were used. The results of the comparative tests are shown in Tables 13, 14, and 15.

TABLE 10

| Comparative Example | 2-cyanoacrylic acid ester (wt %) | | Alcohol (wt %) | | Additive (wt %) | Stabilizer (ppm) | | Polymerization accelerator (ppm) | |
|---|---|---|---|---|---|---|---|---|---|
| 1 | Ethyl ester | 100 | | | | $SO_2$ HQ | 20 500 | 18-crown-6 | 200 |
| 2 | Ethyl ester | 100 | | | | $SO_2$ HQ | 20 500 | | |
| 3 | Ethyl ester | 80 | Butyl alcohol | 20 | | $SO_2$ HQ | 20 500 | 18-crown-6 | 200 |
| 4 | Ethyl ester | 70 | Butyl alcohol | 30 | | $SO_2$ HQ | 20 500 | 18-crown-6 | 200 |
| 5 | Ethyl ester | 80 | Ethyl alcohol | 20 | | $SO_2$ HQ | 20 500 | 18-crown-6 | 200 |
| 6 | Ethyl ester | 70 | Ethyl alcohol | 30 | | $SO_2$ HQ | 20 500 | 18-crown-6 | 200 |

TABLE 11

| Comparative Example | 2-cyanoacrylic acid ester (wt %) | | Aliphatic carboxylic acid ester (wt %) | | Additive (wt %) | Stabilizer (ppm) | | Polymerization accelerator (ppm) | |
|---|---|---|---|---|---|---|---|---|---|
| 7 | Ethyl ester | 80 | Methyl laurate | 20 | | $SO_2$ HQ | 20 500 | | |
| 8 | Ethyl ester | 80 | Butyl acetate | 20 | | $SO_2$ HQ | 20 500 | 18-crown-6 | 200 |
| 9 | Ethyl ester | 70 | Butyl acetate | 30 | | $SO_2$ HQ | 20 500 | 18-crown-6 | 200 |
| 10 | Ethyl ester | 70 | n-amyl acetate | 30 | | $SO_2$ HQ | 20 500 | 18-crown-6 | 200 |
| 11 | Ethyl ester | 70 | n-butyl acrylate | 30 | | $SO_2$ HQ | 20 500 | 18-crown-6 | 200 |
| 12 | Ethyl ester | 70 | Dimethyl succinate | 30 | | $SO_2$ HQ | 20 500 | 18-crown-6 | 200 |
| 13 | Ethyl ester | 70 | Diethyl succinate | 30 | | $SO_2$ HQ | 20 500 | 18-crown-6 | 200 |
| 14 | Ethyl ester | 80 | Diisopropyl malonate | 30 | | $SO_2$ HQ | 20 500 | 18-crown-6 | 200 |

TABLE 12

| Comparative Example | 2-cyanoacrylic acid ester (wt %) | | Carbocyclic carboxylic acid ester (wt %) | | Additive (wt %) | Stabilizer (ppm) | | Polymerization accelerator (ppm) | |
|---|---|---|---|---|---|---|---|---|---|
| 15 | Ethyl ester | 70 | Dimethyl phthalate | 30 | | $SO_2$ HQ | 20 500 | 18-crown-6 | 200 |
| 16 | Ethyl ester | 70 | Dimethyl phthalate | 30 | | $SO_2$ HQ | 20 500 | 18-crown-6 | 200 |
| 17 | Ethyl ester | 70 | Bis(2-ethylhexyl) phthalate | 30 | | $SO_2$ HQ | 20 500 | | |

TABLE 13

| Comparative Example | Finger set time (sec) | | | | Set time (sec) | |
|---|---|---|---|---|---|---|
| | A | B | C | D | Rigid polyvinyl chloride | Balsa |
| 1 | <1 | <1 | <1 | <1 | 3 | 7 |
| 2 | <1 | <1 | <1 | <1 | 10 | 60< |
| 3 | <1 | <1 | <1 | <1 | 2 | 10 |
| 4 | 1–15 | 1–15 | 1–15 | 1–15 | 3 | 10 |
| 5 | <1 | <1 | <1 | <1 | 2 | 5 |
| 6 | 1–15 | 1–15 | 1–15 | 1–15 | 3 | 10 |

TABLE 14

| Comparative Example | Finger set time (sec) | | | | Set time (sec) | |
|---|---|---|---|---|---|---|
| | A | B | C | D | Rigid polyvinyl chloride | Balsa |
| 7 | 60< | 60< | 60< | 60< | 30 | 60< |
| 8 | <1 | <1 | <1 | <1 | 3 | 5 |
| 9 | 1–15 | 1–15 | 1–15 | 1–15 | 5 | 10 |
| 10 | 1–15 | 1–15 | 1–15 | 1–15 | 5 | 10 |
| 11 | 1–15 | 1–15 | 1–15 | 1–15 | 5 | 15 |
| 12 | 1–15 | 1–15 | 1–15 | 1–15 | 5 | 10 |
| 13 | 1–15 | 1–15 | 1–15 | 1–15 | 5 | 15 |
| 14 | 1–15 | 1–15 | 1–15 | 1–15 | 5 | 15 |

TABLE 15

| Comparative Example | Finger set time (sec) | | | | Set time (sec) | |
|---|---|---|---|---|---|---|
| | A | B | C | D | Rigid polyvinyl chloride | Balsa |
| 15 | <1 | <1 | <1 | <1 | 5 | 10 |
| 16 | 1–15 | 1–15 | 1–15 | 1–15 | 5 | 7 |
| 17 | 60< | 60< | 60< | 60< | 10 | 60< |

What is claimed is:

1. A cyanoacrylate adhesive composition, comprising:
   a cyanoacrylate,
   0.001% to 10% by weight, based upon the total weight of said cyanoacrylate adhesive composition, of anionic polymerization accelerator(s); and at least one member selected from the group A–D:
- A 10% to 40% by weight, based upon the total weight of said cyanoacrylate adhesive composition, of an aliphatic alcohol having an aliphatic group comprising 6 or more carbon atoms directly bonded with each other;
- B 5% to 30% by weight, based upon the total weight of said cyanoacrylate adhesive composition, of an aliphatic carboxylic acid ester having an aliphatic group comprising, 6 or more carbon atoms directly bonded with each other;
- C 5% to 30% by weight, based upon the total weight of said cyanoacrylate adhesive composition, of an aliphatic carboxylic acid ester having at least 2 aliphatic groups, each of said aliphatic groups comprising 4 or more carbon atoms directly bonded with each other; and
- D 5% to 30% by weight, based upon the total weight of said cyanoacrylate adhesive composition, of a carboxylic acid ester of a carbocylic compound having, in a carboxylic acid residue or alcohol residue, an aliphatic group comprising 5 or more carbon atoms directly bonded with each other.

2. A cyanoacrylate adhesive composition according to claim 1, wherein said member selected from group A–D is an aliphatic alcohol of Group A having an aliphatic group comprising 9 or more carbon atoms directly bonded with each other.

3. A cyanoacrylate adhesive composition according to claim 2, wherein said aliphatic alcohol of Group A is decanol, tridecanol, or lauryl alcohol.

4. A cyanoacrylate adhesive composition according to claim 1, wherein said member selected from group A–D is an aliphatic carboxylic acid ester of Group B having an aliphatic group comprising 8 or more carbon atoms bonded with each other.

5. A cyanoacrylate adhesive composition according to claim 4, wherein said carboxylic acid ester of Group B is methyl laurate, dimethyl sebacate, octyl acrylate, or decyl methacrylate.

6. A cyanoacrylate adhesive composition according to claim 1, wherein said member selected from group A–D is an aliphatic carboxylic acid ester of Group C having at least 3 aliphatic groups, each of said aliphatic groups comprising at least 4 or more carbon atoms directly bonded with each other.

7. A cyanoacrylate adhesive composition according to claim 6, wherein said aliphatic carboxylic acid ester of Group C is tributyl acetylcitrate.

8. A cyanoacrylate adhesive composition according to claim 1, wherein said member selected from group A–D is a carboxylic acid ester of a carbocyclic compound of Group D having, in a carboxylic acid residue or alcohol residue, an aliphatic group comprising at least 8 carbon atoms directly bonded with each other.

9. A cyanoacrylate adhesive composition according to claim 8, wherein said carboxylic acid ester of a carbocyclic compound of Group D is an ester of phthalic acid or trimellitic acid.

10. A cyanoacrylate adhesive composition according to claim 9, wherein said carboxylic acid ester of a carbocyclic compound of Group D is bis(2-ethylhexyl)phthalate or tris(2-ethylhexyl)trimellitate.

11. A cyanoacrylate adhesive composition according to claim 1, wherein said member selected from group A–D is a carboxylic acid ester of a carbocyclic compound of Group D having, in a carboxylic acid residue or alcohol residue, an aliphatic group comprising 9 or more carbon atoms directly bonded with each other.

12. A cyanoacrylate adhesive composition according to claim 11, wherein said carboxylic acid ester of Group D is diisononyl phthalate, diisodecyl phthalate, or diisotridecyl phthalate.

13. The cyanoacrylate adhesive composition according to claim 1, wherein the composition further contains a polymer or copolymer of an acrylate or methacrylate.

14. The cyanoacrylate adhesive composition according to claim 13, wherein the polymer or copolymer of an acrylate or methacrylate is polymethyl methacrylate, polybutyl methacrylate, or a copolymer of methyl methacrylate with an acrylate.

15. A cyanoacrylate adhesive composition according to claim 1, wherein said composition further contains fumed silica viscosity enhancing agent.

16. A cyanoacrylate adhesive composition according to any one of claims 1–15, in which said anionic polymerization accelerator(s) comprise(s) one or more accelerators selected from the group of the following classes of accelerators:
- a) polyalkylene oxides and derivatives thereof;
- b) crown ethers and derivatives thereof;
- c) silacrown compounds and derivatives thereof;
- d) calixarene compounds and derivatives thereof; and
- e) cyclosulfur compounds and derivatives thereof.

17. A cyanoacrylate adhesive composition according to claim 16 wherein two of said anionic polymerization accelerators are selected.

18. A cyanoacrylate adhesive composition, comprising:
- (1) ethyl 2-cyanoacrylate;
- (2) from 5% to 30% by weight, based upon the total weight of said cyanoacrylate adhesive composition, of an aliphatic carboxylic acid ester having at least 2 aliphatic groups comprising at least 4 carbon atoms directly bonded with each other;
- (3) 0.001% to 10% by weight, based upon the total weight of said cyanoacrylate adhesive composition, of two anionic polymerization accelerators, one selected from the group of polyalkylene oxides and derivatives thereof, and the other selected from the group of crown ethers and derivatives thereof,
- (4) a fumed silica viscosity enhancing agent; and
- (5) a polymer or copolymer of an acrylate or methacrylate.

19. A cyanoacrylate adhesive composition, comprising at least one compound selected from the Groups A–C below; from 0.001% to 10% by weight, based upon the total weight of said cyanoacrylate adhesive composition, of anionic polymerization accelerator(s); and optionally, a viscosity enhancing agent, wherein said viscosity enhancing agent is a polymer or copolymer of an acrylate or methacrylate;
- A: from 10% to 40% by weight, based upon the total weight of said cyanoacrylate adhesive composition, of an aliphatic alcohol having an aliphatic group comprising at least 6 carbon atoms directly bonded with each other;
- B: from 5% to 30% by weight, based upon the total weight of said cyanoacrylate adhesive composition, of an aliphatic carboxylic acid ester having at least 2 aliphatic groups, each of said aliphatic groups comprising at least 4 carbon atoms directly bonded with each other;
- C: from 5% to 30% by weight, based upon the total weight of said cyanoacrylate adhesive composition, of a carboxylic acid ester of a carbocyclic compound having, in a carboxylic acid residue or alcohol residue, an aliphatic group comprising from 9 to less than 15 carbon atoms directly bonded with each other.

20. The cyanoacrylate adhesive composition of claim 19, further comprising a polymer or copolymer of an acrylate or methacrylate.

21. The cyanoacrylate adhesive composition of claim 20, wherein the polymer or copolymer of an acrylate or methacrylate is polymethyl methacrylate, polybutyl methacrylate, or a copolymer of methyl methacrylate with an acrylate.

22. A cyanoacrylate adhesive composition according to any one of claims 19–21, in which said anionic polymerization accelerator(s) comprise(s) one or more of said accelerators selected from the group of the following classes of accelerators:
   a) polyalkylene oxides and derivatives thereof;
   b) crown ethers and derivatives there;
   c) silacrown compounds and derivatives thereof; and
   d) cyclosulfur compounds and derivatives thereof.

23. A composition comprising a liquid mixture of:
   2-cyanoacrylate;
   a compound selected from the group of a 6 to 15 carbon atom aliphatic alcohol, a 6 to 15 carbon atom aliphatic carboxylic acid ester, an aliphatic carboxylic acid ester having at least two 4–8 carbon atom aliphatic groups, and a carboxylic acid ester of a carbocyclic compound having a 5 to 15 carbon atom aliphatic group; and
   anionic polymerization accelerator(s), wherein said anionic polymerization accelerator(s) is(are) selected to provide a stable, uncured liquid adhesive mixture during storage of the composition.

24. A composition as in claim 23 comprising 10–40% by weight of the 6 to 15 carbon atom aliphatic alcohol.

25. A composition as in claim 24 comprising 15–30% by weight of the 6 to 15 carbon atom aliphatic alcohol.

26. A composition as in claim 23, 24 or 25, wherein said composition comprises at least one aliphatic alcohol selected from the group of n-hexyl alcohol, n-octyl alcohol, n-nonyl alcohol, decyl alcohol, lauryl alcohol, tridecyl alcohol, tetradecyl alcohol, pentadecyl alcohol, β-citronellol, 9-decene-1-ol, 1,1-dimethyl-5-methyl-6-heptene-1-ol, dihydromyrcenol, geraniol, 1,5-dimethyl-1-vinyl-hexene-1-ol and ω-undecenyl alcohol.

27. A composition as in claim 23 comprising 10–40% by weight of the 6 to 15 carbon atom aliphatic carboxylic acid ester.

28. A composition as in claim 24 comprising 15–30% by weight of the 6 to 15 carbon atom aliphatic carboxylic acid ester.

29. A composition as in claim 23, 27 or 28, wherein said composition comprises at least one 6 to 15 carbon atom aliphatic carboxylic acid ester selected from the group of cetyl 2-ethyl hexylate, methyl ester of coconut fatty acid, methyl laurate, isopropyl myristate, methyl caprate, methyl oleate, isobutyl oleate, octyl oleate, 2-ethylhexyl crotonate, octyl acrylate, decyl methacrylate, tridecyl methacrylate, lauryl methacrylate, and lauryl propiolate.

30. A composition as in claim 23, 27 or 28, wherein said composition comprises at least one 6 to 15 carbon atom aliphatic carboxylic acid ester selected from the group of bis(2-ethylhexyl)adipate, bis(2-ethylhexyl)maleate, dimethyl sebacate, bis(2-ethylhexyl) decamethylenedicarboxylate, 2,2,4-trimethyl-1,3-pentanediolmonoisobutylate, 2,2,4-trimethyl-1,3-pentanedioldiisobutylate, triglyceride 2-ethyl hexanoate, triglyceride caprylate, diglyceride caprylate and triglyceride caprate.

31. A composition as in claim 23 comprising an aliphatic carboxylic acid ester having at least two 4 to 8 carbon atom aliphatic groups, each of said aliphatic group comprising 8–13 carbon atoms directly bonded with each other.

32. A composition as in claim 23 comprising an aliphatic carboxylic acid ester having at least three 4 to 8 carbon atom aliphatic groups.

33. A composition as in claim 23 comprising 1–40% by weight of the aliphatic carboxylic acid ester having at least two 4 to 8 carbon atom aliphatic groups.

34. A composition as in claim 33 comprising 5–30% by weight of the aliphatic carboxylic acid ester having at least two 4 to 8 carbon atom aliphatic groups.

35. A composition as in claim 23, 33 or 34, wherein said composition comprises at least one aliphatic carboxylic acid ester having at least two 4 to 8 carbon atom aliphatic groups selected from the group of diisobutyl fumarate, diisobutyl maleate, tributyl acetyl citrate and triglyceride caproate.

36. A composition as in claim 23 comprising a carboxylic acid ester of a carbocyclic compound having a 5 to 15 carbon atom aliphatic group, wherein said carboxylic acid ester is an ester of a carbocyclic carboxylic acid and an alcohol, wherein the carbocyclic carboxylic acid is selected from the group of benzoic acid, o-toluic acid, m-toluic acid, p-toluic acid, o-chlorobenzoic acid, salicylic acid, anisic acid, vanillic acid, veratric acid, peperonylic acid, protocatechuic acid, gallic acid, syrnigic acid, cyclohexane carboxylic acid, 3-biphenyl carboxylic acid, 1,5-naphthalene dicarboxylic acid, 2-naphthalene hexanoic acid, 1,3,6-naphthalene triacetic acid, camphoric acid, phthalic acid, mellophanic acid, pyromellitic acid, benzene pentacarboxylic acid, mellitic acid, phenyl acetic acid, hydrocinnamic acid, γ-phenyl butyric acid, δ-phenyl-n-valerianic acid, ε-phenyl-n-capric acid, cinnamic acid, phenyl propiolic acid, homophthalic acid, o-phenylene diacetic acid, m-phenylene diacetic acid, p-phenylene diacetic acid, o-phenylene diacetic acid-β-propionic acid, cinamal malonic acid, ω-phenyl-n-propyl malonic acid, acetyl cumaric acid and cochenilic acid.

37. A composition as in claim 36 wherein said alcohol is selected from the group of n-pentyl alcohol, n-hexyl alcohol, n-octyl alcohol, 2-ethylhexyl alcohol, n-nonyl alcohol, isononyl alcohol, decyl alcohol, isodecyl alcohol, tridecyl alcohol, tetradecyl alcohol, pentadecyl alcohol, β-citronellol, 9-decene-1-ol, 1,1-dimethyl-5-methyl-6-heptene-1-ol, gernaiol, 1,5-dimethyl-1-vinyl-4-hexene-1-ol and ω-undecenyl alcohol.

38. A composition as in claim 23, wherein said carbocyclic carboxylic acid ester is selected from the group of dihexyl phthalate, diheptyl phthalate, dioctyl phthalate, bis(2-ethylhexyl)phthalate, diisononyl phthalate, diisodecyl phthalate, diisotridecyl phthalate, dipentadecyl phthalate, dioctyl terephthalate, diisononyl isophthalate, decyl toluylate, bis(2-ethylhexyl)camphorate, 2-ethylhexyl cyclohexyl carboxylate, 2-ethylhexylbenzoate, bis(2-ethylhexyl) pyromellitate and tris (2-ethylhexyl)trimellitate.

39. A composition as in claim 23, wherein said carbocyclic carboxylic acid ester is selected from the group of bis(2-ethylhexyl)phthalate, diisononyl phthalate, diisodecyl phthalate, diisotridecyl phthalate and tris(2-ethylhexyl) trimellitate.

40. A composition as in claim 23, comprising 1–40% by weight of a carboxylic acid ester of a carbocyclic compound having an 8 to 13 carbon atom aliphatic group.

41. A composition as in claim 23, comprising 5–30% by weight of a carboxylic acid ester of a carbocyclic compound having an 8 to 13 carbon atom aliphatic group.

42. A composition as in claim 23, wherein said anionic polymerization accelerator comprises a polyalkylene oxide, an ester of a polyalkylene oxide or an ether of a polyalkylene oxide.

43. A composition as in claim 23, wherein said anionic polymerization accelerator comprises a crown ether.

44. A composition as in claim 23, wherein said anionic polymerization accelerator comprises a silicacrown compound.

45. A composition as in claim 23, wherein said anionic polymerization accelerator comprises a calixarene.

46. A composition as in claim 23, wherein said anionic polymerization accelerator comprises a cyclosulfur compound.

47. A composition as in claim 23, comprising tributyl acetyl citrate.

48. A composition as in any one of claims 41–46, wherein said composition comprises 0.001% to 1% by weight of said anionic polymerization accelerator.

49. A composition as in claim 23 further comprising a thickener selected from the group of polymethyl methacrylate, acrylic rubber, cellulose derivative and fumed silica.

50. A composition as in claim 49, wherein said composition comprises 0.003% to 1% by weight of said anionic polymerization accelerator.

51. A composition as in claim 50, wherein said anionic polymerization accelerator comprises a crown ether and a polyalkylene oxide.

52. A composition as in claim 49, wherein said carbocyclic carboxylic acid ester is selected from the group of bis(2-ethylhexyl)phthalate, diisononyl phthalate, diisodecyl phthalate, diisotridecyl phthalate and tris (2-ethylhexyl) trimellitate.

53. A composition as in claim 50, further comprising a stabilizer selected from hydroquinone and sulfurous acid gas.

54. A composition as in claim 23, wherein said composition comprises ethyl 2-cyanoacrylic acid ester, diisononyl phthlate, acrylic polymer, sulfur dioxide gas, hydroquinone and 18-crown-6.

55. A composition as in claim 23, wherein the composition comprises ethyl 2-cyanoacrylic acid ester, tributyl acetylcitrate, sulfur dioxide gas, hydroquinone and 18-crown-6.

56. A composition as in claim 23 comprising 70–80% by weight of ethyl 2-cyanonacrylic acid ester, 10–30% by weight aliphatic carboxylic acid ester or alcohol and 0–10% by weight of thickener.

57. A composition of matter comprising:
  a 2-cyanoacrylate;
  1–40% by weight of a compound selected from the group of a 6 to 15 carbon atom aliphatic alcohol, a 6 to 15 carbon atom aliphatic carboxylic acid ester, an aliphatic carboxylic acid ester having at least two 4 to 8 carbon atom aliphatic groups and a carboxylic acid ester of a carbocyclic compound having a 5 to 15 carbon atom aliphatic group; and
  0.001% to 10% by weight of an anionic polymerization accelerator, wherein said composition is a liquid mixture that can be stably stored.

58. A composition as in claim 57, wherein said composition adheres to balsa more quickly than to skin.

59. A composition as in claim 58, wherein said composition adheres to balsa substantially instantaneously.

60. A composition as in claim 57, wherein said composition adheres to polyvinyl chloride more quickly than to skin.

61. A composition as in claim 60, wherein said composition adheres to polyvinyl chloride substantially instantaneously.

62. An adhesive comprising a stable, uncured, liquid mixture of:
  2-cyanoacrylate;
  at least one compound selected from the group of an aliphatic alcohol, an aliphatic carboxylic acid ester, and a carboxylic acid ester of a carbocyclic compound; and
  an anionic polymerization accelerator;
  wherein said adhesive adheres to balsa more quickly than to skin.

63. An adhesive as in claim 62, wherein said adhesive adheres to balsa substantially instantaneously.

64. An adhesive comprising a stable, uncured, liquid mixture of:
  2-cyanoacrylate;
  at least one compound selected from the group of an aliphatic alcohol, an aliphatic carboxylic acid ester, and a carboxylic acid ester of a carbocyclic compound; and
  an anionic polymerization accelerator;
  wherein said adhesive adheres to polyvinyl chloride more quickly than to skin.

65. An adhesive as in claim 64, wherein said adhesive adheres to polyvinyl chloride adheres substantially instantaneously.

66. A composition comprising:
  a 2-cyanoacrylate;
  a compound selected from the group of a 6 to 15 carbon aliphatic alcohol, a 6 to 15 carbon aliphatic carboxylic acid ester, an aliphatic carboxylic acid ester having at least two 4 to 8 carbon atom aliphatic groups, and a carboxylic acid ester of a carbocyclic compound having a 5 to 15 carbon atom aliphatic group; and
  an anionic polymerization accelerator selected from a polyalkylene oxide and derivatives thereof, a crown ether and derivatives thereof, a silacrown and derivatives thereof, a calixarene and derivatives thereof, and a cyclosulfur and derivatives thereof.

67. A composition as in claim 66, wherein said anionic polymerization accelerator comprises between 0.001% to 10% by weight of said composition.

* * * * *